United States Patent [19]
Vogel

[11] 4,252,333
[45] Feb. 24, 1981

[54] KEYLESS CHUCK

[75] Inventor: John D. Vogel, Brecksville, Ohio

[73] Assignee: Black & Decker Inc., Newark, Del.

[21] Appl. No.: 940,898

[22] Filed: Sep. 11, 1978

[51] Int. Cl.³ .............................................. B23B 31/12
[52] U.S. Cl. .................................. 279/72; 279/1 ME;
279/59; 279/64
[58] Field of Search .................. 279/1 ME, 1 Q, 1 W,
279/60, 64, 65, 56, 59, 81, 70, 72, 75; 408/239

[56] References Cited

U.S. PATENT DOCUMENTS

| | | | |
|---|---|---|---|
| 1,679,299 | 7/1928 | Fegley et al. ........................... | 279/56 |
| 2,069,527 | 2/1937 | Kirkland ........................... | 408/239 X |

FOREIGN PATENT DOCUMENTS

| | | | |
|---|---|---|---|
| 89122 | 8/1922 | Austria ....................................... | 279/59 |
| 89124 | 8/1922 | Austria ....................................... | 279/72 |
| 98378 | 6/1924 | Austria . | |
| 342380 | 10/1921 | Fed. Rep. of Germany ............. | 279/56 |
| 383129 | 10/1923 | Fed. Rep. of Germany . | |
| 395322 | 5/1924 | Fed. Rep. of Germany . | |
| 683666 | 12/1952 | United Kingdom .................. | 279/1 ME |

*Primary Examiner*—Z. R. Bilinsky
*Attorney, Agent, or Firm*—Leonard Bloom; Edward D. Murphy; Harold Weinstein

[57] ABSTRACT

A keyless chuck adapted to grip an object, such as a drill bit, is disclosed. The keyless chuck includes a cylindrical body provided with an axially extending tapered bore. The surface of the tapered bore includes first and second cam surfaces. A control sleeve is provided surrounding at least a portion of the cylindrical body and is adapted for controlled axial movement relative to the cylindrical body. A retaining element is attached to the control sleeve and partially closes one end of the cylindrical body. A thrust bearing is provided in the retaining element. Gripping elements are positioned within the tapered bore and are adapted to engage and grip the tool when the tool is inserted between the gripping elements. A thrust bearing is positioned in the retaining element which operatively engages the gripping elements. A spring retains the gripping elements in contact with the tapered bore and also with the thrust bearing wherein, upon axial movement of the control sleeve relative to the cylindrical body, the gripping elements move axially within the tapered bore in contact with the first cam means, thereby causing radial movement of the gripping elements and wherein, upon rotation of the cylindrical body relative to the gripping elements, the gripping elements shift along the surface of the second cam and thereby also cause radial movement of the gripping elements.

13 Claims, 9 Drawing Figures

KEYLESS CHUCK

BACKGROUND OF THE INVENTION

1. Field of the Invention

This invention relates to an improved keyless drill chuck.

2. Description of the Prior Art

Prior art drill chucks, used both commercially and by hobbyists, have generally required the use of a separate key for adequately tightening the gripping jaws of the chuck against a tool shank, such as a drill bit, in order to insure that the bit does not slip relative to the chuck during a drilling operation. It has long been felt, however, that the use of a separate key was both annoying and inconvenient. That is, the tightening of the drill chuck is a cumbersome operation which wastes valuable time. Also, if the key is lost, the drill cannot be used. Further, the key used with one drill chuck is not necessarily interchangeable for use with other drill chucks of different manufacture. Still further, it has long been recognized that to insure uniform gripping of a bit of each of the jaws of a chuck, the key must be progressively positioned and rotated adjacent to each succeeding gripping jaw. This particular method of operation is often overlooked, with resulting slippage, off-center gripping and scoring of the bit.

To overcome the inherent deficiencies of key-type drill chucks, attempts have been made at constructing a keyless drill chuck. However, these prior art attempts have failed for a number of reasons, for instance, the relative complexity of the design, the inability to obtain adequate gripping force on the bit, the difficulty encountered in attempting to release the bit from the drill chuck after the drilling operation is completed and the inability to accurately grip the bit in a central position. Further, many of the prior art keyless drill chucks are operative in only one direction, and, as a result, these drill chucks are not useable with reversible drills.

Kirkland, U.S. Pat. No. 2,220,654, is an example of a prior art keyless drill chuck. The chuck in this patent includes a sleeve having a shoulder, a cam bushing being received within the sleeve and abutting the shoulder, a core member having a plurality of axially directed slots and a threaded portion, and a plurality of tapered rollers positioned within the axially directed slots. The core member and tapered roller assembly are received within the cam bushing and a driving member is threadably received by the core member threaded portion. The tapered rollers are retained within the axially directed slots by a reduced clearance portion formed on an inner part of each slot. The chuck utilizes a pin fixed to the sleeve and received within a steep pitch slot in the core member for rotating, thereby axially moving the core member relative to the driving member, and the driving connection between a drive motor and the tool is through the threaded connection between the driving member and the core member.

Some disadvantages of this chuck are (1) the size of a tool that can be inserted within, or held by, the core member is limited by the dimensions of the core member and by the reduced clearance portion formed on the inner part of each slot in the core member; (2) since the driving connection is through a threaded fitting, the chuck is useable only in a single rotary direction; (3) the tapered rollers are not biased to an open equally spaced position; (4) the sleeve fixed pin and the driving connection between the drive member and the tool are through a threaded connection; and (5) an anti-friction thrust bearing is not provided for assisting the circumferential movement of the tapered rollers along the tapered bore with a planetary action.

Kirkland, U.S. Pat. No. 2,069,527, discloses a keyless chuck in FIG. 8 which includes a multi-directional driving member having both a tapered bore and varying radius cam surfaces. Received within the tapered bore is a spring-biased core member. The core member is provided with a plurality of axially directed slots in which are located a plurality of tapered gripping rollers. The rollers are retained within the axially directed slots by a reduced clearance portion formed on an inner part of each slot. A gauge sleeve is provided threadably engaged with matching threads on the outer circumference to the driving member. The gauge sleeve acts against the core member for forcing the tapered gripping rollers into the tapered recess of the driving member.

Some disadvantages of this chuck are (1) the reduced clearance portion formed on the inner part of each slot permits the chuck to be used for holding tools of only a single diameter; (2) the tapered rollers are not biased to an open equally position; (3) an anti-friction thrust bearing is not provided for assisting the circumferential movement of the tapered rollers along the tapered bore with a planetary action.

SUMMARY OF THE INVENTION

An object of the present invention is to provide a keyless chuck which is operable to forcefully and accurately grip a shanked tool such as a drill bit.

Another object is to provide a keyless chuck which adjusts the gripping force of tapered rollers on a bit in relation to the resistance presented by the piece being worked upon.

Still another object is to provide a keyless chuck which is equally useful when rotated in either a clockwise or a counterclockwise direction.

A further object is to provide a keyless chuck which exercises a releasing or relaxing force upon the tapered rollers, when the drill chuck is not in operation, to assist in releasing the bit from the gripping force of the chuck.

Another object is to provide a keyless chuck which exerts a holding force on a bit by both an axially extending tapered bore cam surface and varying radius cam surfaces located on the tapered bore cam surface.

Still another object is to provide a keyless chuck which can accept bits having a wide range of sizes.

Another object is to provide an anti-friction thrust bearing for a keyless chuck which will aid in achieving a higher degree of hard tightening by reducing the drag of the gripping jaws on the control sleeve, and achieving a higher degree of self-tightening by aiding the planetary action of the gripping elements as they shift along the varying radius cam surfaces.

A further object is to provide a spring for a keyless chuck which will not only retain a plurality of gripping members and also bias the gripping members against a tapered bore so as to always urge the gripping members to assume a spaced configuration, but which will further provide a relaxing force for assisting in releasing a gripped tool.

Another object is to provide a keyless chuck which can be used in conjunction with a power operated drill for securing a drill bit.

More specifically, the present invention is directed to a keyless chuck adapted to grip an object, such as a drill bit, comprising a cylindrical body provided with an axially extending tapered bore, the surface of the tapered bore including first and second cam surfaces. A control sleeve is provided surrounding at least a portion of the cylindrical body and is adapted for controlled axial movement relative to the cylindrical body. A retaining means is provided fixed against axial movement relative to the control sleeve and partially closing one end of the cylindrical body, the retaining means including thrust bearing means. Gripping elements are positioned within the tapered bore and are adapted to engage and grip a centrally positioned bit. Spring means are provided for retaining the gripping means in contact with the tapered bore and the thrust bearing means wherein, upon axial movement of the control sleeve relative to the cylindrical body, the gripping elements more axially within the tapered bore in contact with the first cam means and thereby cause radial movement of the gripping elements and wherein, upon rotation of the cylindrical body relative to the gripping elements, the gripping elements shift along the surface of the second cam and thereby also cause radial movement of the gripping elements.

BRIEF DESCRIPTION OF THE DRAWINGS

These and other objects and advantages will become more fully apparent as the following description is read in conjunction with the drawings wherein.

DETAILED DESCRIPTION OF A PREFERRED EMBODIMENT OF THE INVENTION

Figure 1:
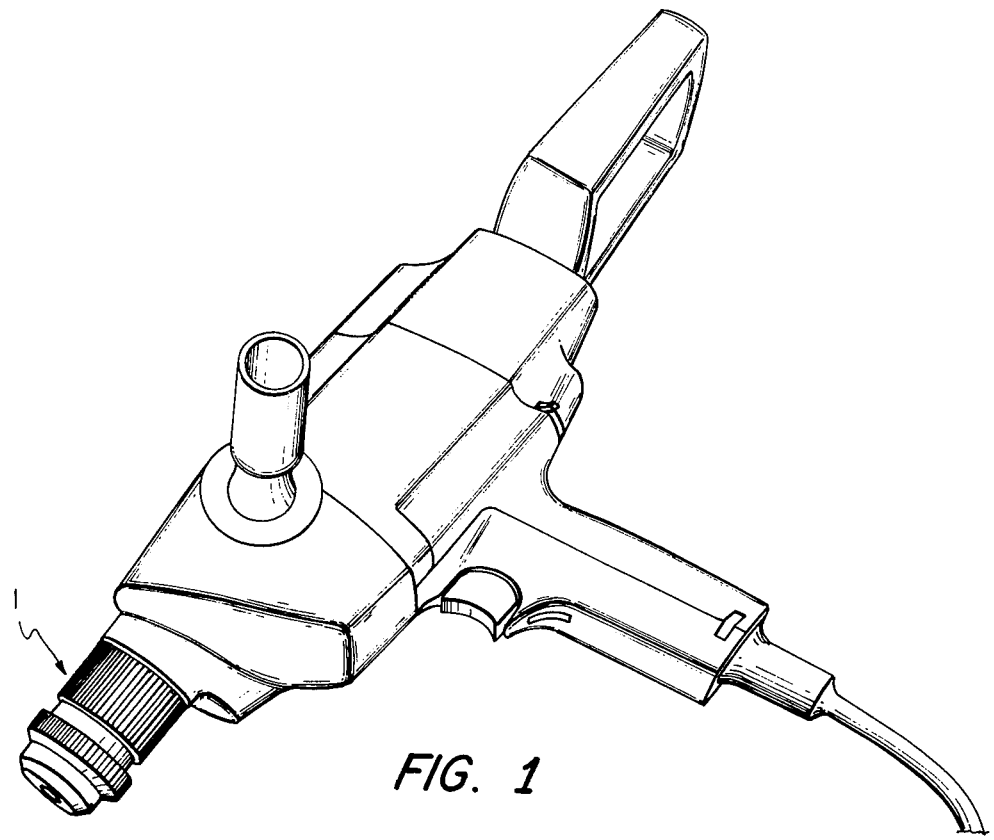
FIG. 1 is a perspective view of a keyless chuck of a preferred embodiment of the invention mounted on an electric drill.

Referring now to the drawings, FIG. 1 illustrates a keyless chuck of the present invention positioned on an electric drill as it would appear in actual use.

Figure 2:
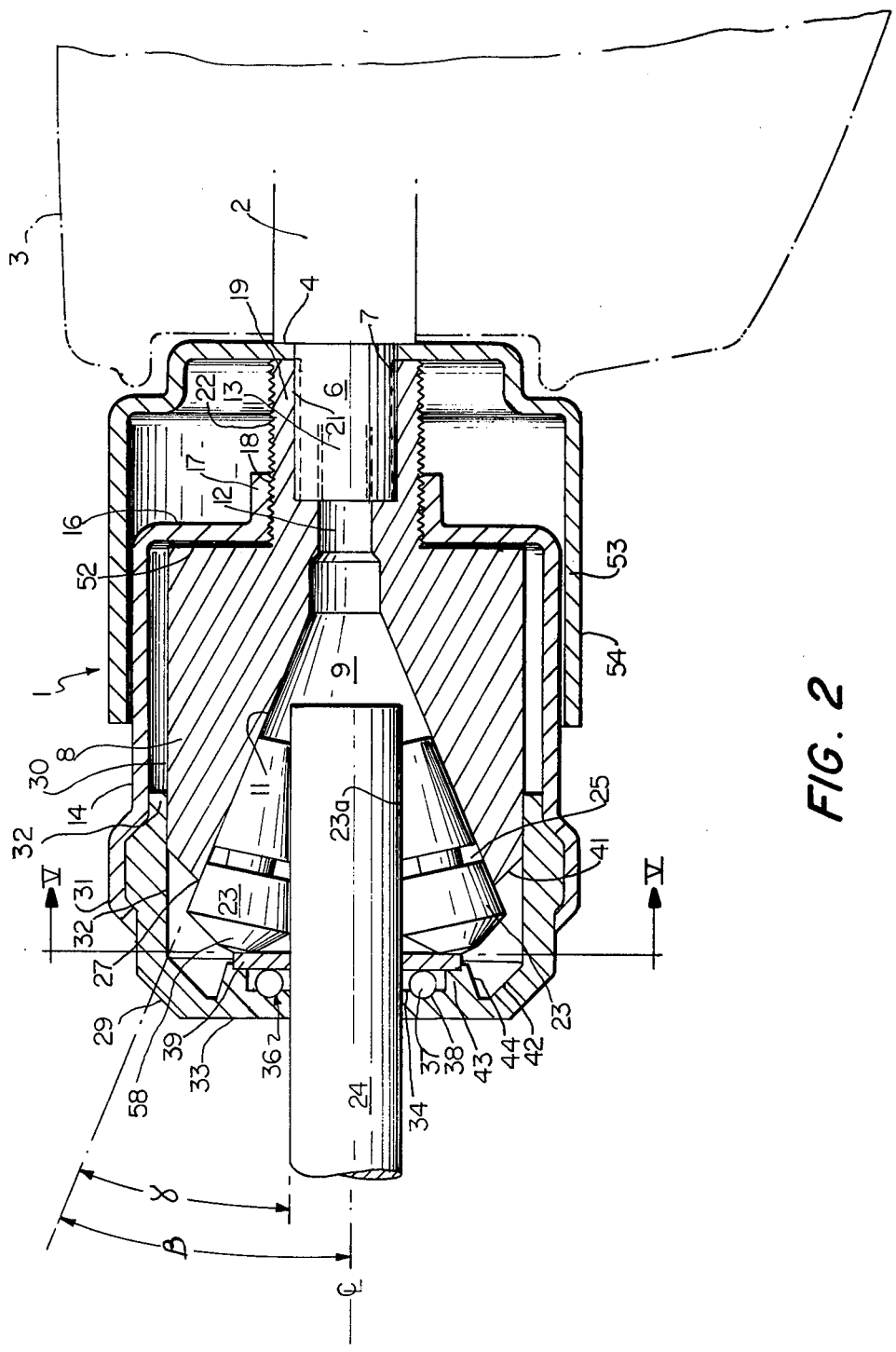
FIG. 2 is a side elevation, in section, of a keyless chuck of the present invention taken generally along the lines II—II of FIG. 5.

As seen in FIG. 2, the drill chuck, generally indicated at 1, is mounted on a drive spindle 2 rotatably supported within the electric drill housing 3. The spindle 2 includes a shoulder 4 and a smaller diameter end portion 6. The keyless drill chuck 1 is mounted on the reduced diameter end portion 6 of the drill drive spindle 2 by means of cooperating threaded portions 7. A key (not shown) positioned between the keyless chuck 1 and the reduced diameter end portion 6, cooperating splines or other known means can be provided in place of the cooperating threaded portions 7 for mounting the keyless chuck to the drive spindle 2.

The keyless chuck 1 has a cylindrically longitudinally extending body 8. One end of the body 8 includes a cylindrical neck portion 19 having external threads 22 and an axial bore 21 for receiving the reduced diameter portion 6 of the drive spindle 2 for mounting the drill chuck 1 in the above said manner on the drill drive spindle 2. The other end of the cylindrical body 8 is provided with an axially extending tapered bore 9 having wall surfaces 11. The tapered bore 9 decreases from a maximum diameter at an open end 27 to a minimum diameter at a portion deeply recessed within the cylindrical body 8. The narrowest portion of the tapered bore extends axially as a cylindrical opening 12, which is adapted to receive a screw (not shown) threadably received within a hole 13 in the end of the reduced diameter end portion 6 of the drive spindle 2. The screw restrains the drill chuck 1 from unscrewing or moving axially relative to the spindle 2.

A cylindrical control sleeve 14 is provided partially surrounding the cylindrical body 8. The control sleeve 14 includes an annular inwardly extending flange 16 partially closing one end of the control sleeve 14. The annular flange 16 forms an axially extending annular collar 17. The collar 17 is internally threaded as indicated at 18. The internal threads 18 of the collar 17 cooperate with the external threads 22 of the cylindrical neck portion 19, thereby providing for controlled reciprocal axial movement of the control sleeve 14 relative to the cylindrical body 8 through rotation of the control sleeve 14 relative to the cylindrical body 8.

A plurality of tapered rollers 23 are provided within the axially extending tapered bore 9. The tapered rollers 23 serve as gripping elements for restraining a tool 24 within the drill chuck 1. The tapered rollers 23 are each formed with an annular recess 25 for receiving a spring 26. The tapered rollers 23 are dimensioned such that an angle $\alpha$, representing the taper angle of each tapered roller, is the same as angle $\beta$, representing the angle of the wall 11 of the tapered bore 9 is to the axial centerline of the tapered bore. By providing the tapered rollers 23 with the same angle as the tapered bore wall 11, the entire centrally directed surface 23A of each tapered roller 23 lies parallel to the axial centerline of the drive spindle 2 and, therefore, comes into contact with a cylindrical tool, such as the drill 24, to insure an even distribution of gripping force on the tool by the tapered rollers 23, as well as insuring that the tool will follow a continuous extension of the axial centerline.

A retaining cap or retaining element 29 is fixed against axial movement relative to the control sleeve 14 by means of, for example, a rolled edge connection 31. The retaining cap 29 partially closes an end of the control sleeve 14 opposite the inwardly extending flange 16. The retaining cap 29 includes an axially extending bearing portion 32 which bears against the circumference 30 of the cylindrical body 8. A flange portion 33 of the retaining cap 29 is provided with an annular recess 24 on an inner face. Located within the annular recess 34 is an anti-friction thrust bearing assembly 36 comprised of a plurality of ball bearings 37 or needle bearings (not shown) mounted in a bearing race 38. A thrust washer 39 is provided seated against the ball/needle bearings 37. The ball bearings 37 and the thrust washer 39 permit a planetary action of the tapered rollers 23 and, therefore, a self-tightening operation under torque load after hand tightening, in a manner to be more fully explained hereinafter. That is, due to the anti-friction bearing assembly 36, the tapered rollers 23 are each able to rotate about their respective longitudinal axis under the influence of the bit 24 and the walls 11 of the tapered bore 9 when the chuck 1 is in use. Without the anti-friction bearing assembly 36, large frictional forces between the large ends of the tapered rollers 23 and the flange portion 33 of the retaining cap 29 would prevent or seriously interfere with the ability of the taper rollers to rotate, thereby affecting the ability of the chuck 1 to grip a bit 24 in the manner to be described.

Further, the anti-friction bearing assembly 36 permits the control ring 14 to be more easily rotated relative to the cylindrical body 8 because the ends of the tapered rollers 23 do not bear directly against the retaining cap 29, thereby permitting a greater degree of hand tightening of the tapered rollers 23 against a bit 24. The importance of the anti-friction bearing assembly 36 can be better appreciated when it is recognized that approximately 8000 pounds of axial thrust are exerted by the tapered rollers 23 against the anti-friction bearing assembly 36. This high thrust load is due, in part, to the relatively steep taper angle of the tapered bore 9 which permits a wide range of shank sizes to be inserted and gripped by a single chuck. Further, the anti-friction bearing assembly 36 approximately doubles the mechanical freedom of the cooperating threaded portions 18 and 22 of the control sleeve 14 and cylindrical body 8, respectively. Finally, the anti-friction bearing assembly 36 serves to make the keyless chuck 1 bi-directionally self-tightening. That is, if the bearing assembly 36 was not provided, planetary action of the tapered rollers 23, due to frictional engagement with flange 33 of the retaining cap 29, would tend to unscrew the cooperating threads 18 and 22 of the control sleeve and the cylindrical body 8 when the chuck 1 was rotatably driven in reverse direction, thereby causing the bit 24 to slip.

The open end 27 of the body 8 is provided with a tapered end 41, while the retaining cap 29 is provided with a matching taper 42. The retaining cap 29 is also formed with a boss 43 in which the annular recess 34 is formed. The boss 43 is provided with a tapered ridge 44 which matches the tapered bore 11 of the body 8. The cooperating complementary surfaces 41 and 42 and 11 and 44 permit the retaining cap 29 to closely engage the cylindrical body 8 and thereby enable the retaining cap to press the tapered rollers 23 deeply within the tapered bore 9, thereby insuring that extremely small shanked tools or drill bits 24 can be securely held within the chuck 1.

Figure 5:
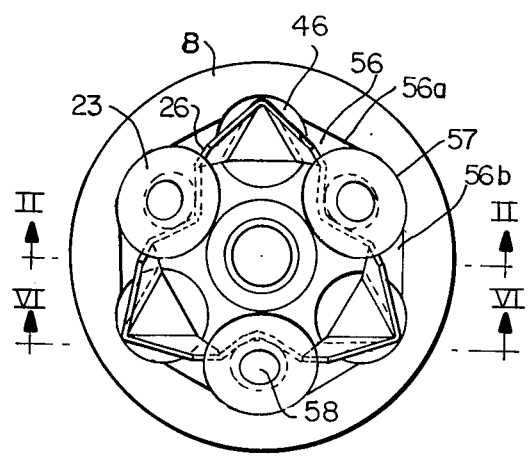
FIG. 5 is an end view in section taken generally along the line V—V in FIG. 2, illustrating the chuck gripping a large diameter bit.

As seen in FIG. 5, the tapered bore 11 of the cylindrical body 8 is provided with a plurality of cam surfaces 56, wherein a radius line between the cam surfaces 56 and the axial centerline of the drill chuck 1 will vary in length as the radius line is rotated about the centerline. Therefore, these surfaces will be referred to as varying radius cam surfaces or second cam means.

Each varying radius cam surface is comprised of two matching portions 56a and 56b extending in opposite directions from a centrally positioned taper 57. The centrally positioned taper 57 is in the position at which the above said radius line has its greatest length, and this centrally positioned taper forms a first cam means.

The varying radius cam surfaces 56 can be formed with a number of different curvatures and, accordingly, different pressure angles relative to the tapered rollers 23. For example, the varying radius cam surface 56 can be formed with a curvature that is asymptotic, that is, with perfect circular geometry. Alternatively, the varying radius curvature can be in the form of straight sided ramps. Since the pressure angle is a function of the surface along which the tapered roller 23 roll, the pressure is a function of the shape of the varying radius cam surface 56. That is, if the tapered bore 11 were a perfect circle, the pressure angle $\theta$, which is a measure of the angle formed between a line passing through the center of the roller surface and the center of the roller and another line passing through the center of the roller and the point of contact between the roller and rolling surface, would be zero. Through experimentation, applicant has found that if the varying radius cam surface has a circular form, the pressure angle will be approximately 5°-6°, and the gripping force by the tapered rollers 23 on the tool will tend to be too tight with resulting galling of the tool 24. Through further experimentation, applicant has found that a varying radius cam surface 56 having a triangular cross-section results in a pressure angle of approximately 8°-10°, which configuration results in fast tightening and a lesser total tightening force, thereby preventing galling of the bit 24.

Interposed between the varying radius cam surfaces 56 is a plurality of axially extending cylindrical bores 46 which extend completely through the cylindrical body 8.

Figure 7:
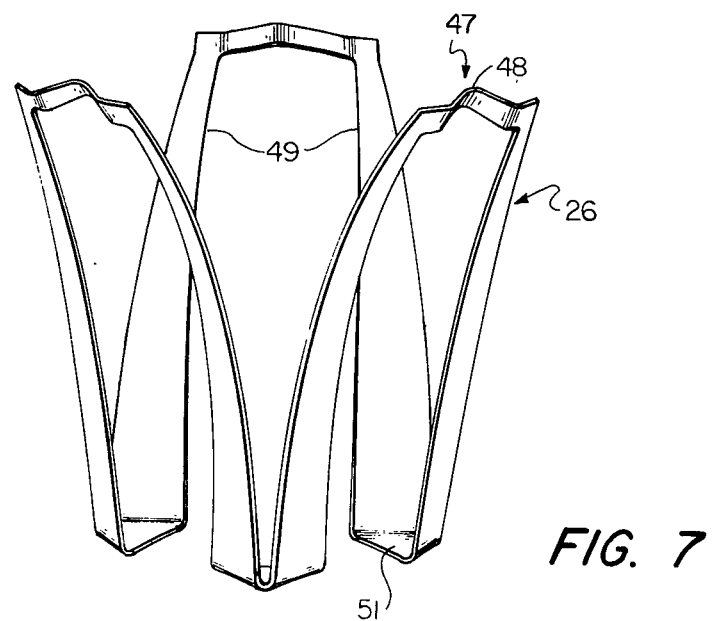
FIG. 7 is a perspective view of a spring used in one embodiment of the present invention.

FIG. 7 illustrates a spring generally designated as 26 which includes a plurality of bifurcated arm members 47. Each of the bifurcated arms 47 includes an arcuate joining portion 48. The arcuate joining portions 48 engage in the annular recesses 25 formed in the tapered rollers 23. Each bifurcated member 47 includes a pair of arms 49. The end of each arm 49 opposite the joining portion 48 is connected to the adjacent end of the adjoining arm 49 at a flattened transversely extending connecting portion 51, thereby forming the continuous spring element 26.

Each of the transversely extending connection portions 51 and the associated pair of adjoining arms 49 are inserted into a respective cylindrical bore 46. The ends 51 extend through the respective cylindrical bores 46 and abut an inner edge 52 of the annular inwardly extending flange 16 of the control sleeve 14.

As seen in FIG. 7, each of the bifurcated arm members 47 is relatively long and gently outwardly bowed, so that when the arcuate joining portions 48 are engaged in annular recesses formed in the tapered rollers 23 and the transversely extending connection portions 51 and the associated adjoining arms 49 are inserted into the cylindrical bore 46, the tapered rollers 23 will be constantly urged or pressed against the wall surfaces 11 of the tapered bore 9 formed in the cylindrical body 8. Also, the length of the arms 49 are so dimensioned that when the transversely extending connecting portion 51 is seated against the inner edge 52 of the annular inwardly extending flange 16 of the control sleeve 14, the outermost tips 58 of the tapered rollers 23 will be maintained in contact with the thrust washer 39 seated on the thrust bearing 36.

Turning again to FIG. 2, a dirt shield 53 is provided for preventing the entry of foreign particles into the area of the cooperating threads 18 and 22 of the body 8 and the control sleeve 14, respectively. The dirt shield 53 is non-rotatably attached with respect to the cylindrical body 8 and the drive spindle 2 and, therefore, provides a means for preventing rotation of the cylindrical body 8 during relative rotation of the control sleeve 14 when either mounting or removing a bit 24, in a manner to be more fully explained later. To assist in performing this function, the dirt shield 53 is provided with a knurled surface 54.

Figure 3:
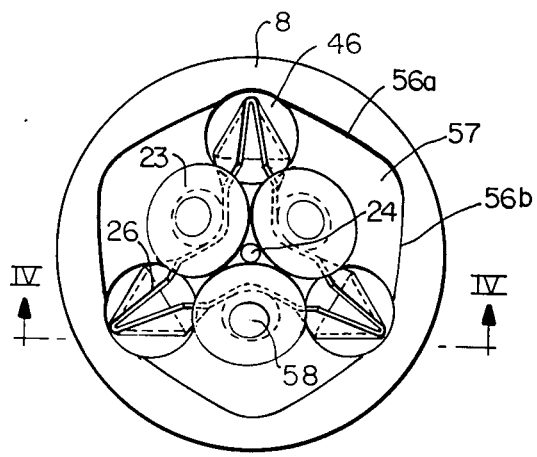
FIG. 3 is an end view, in section, illustrating the chuck of FIG. 2 gripping a small diameter bit.
Figure 4:
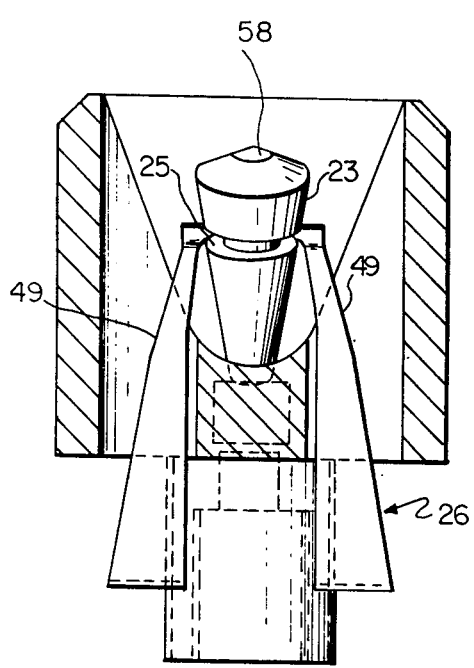
FIG. 4 is an enlarged sectional view taken generally along the line IV—IV of FIG. 3.
Figure 6:
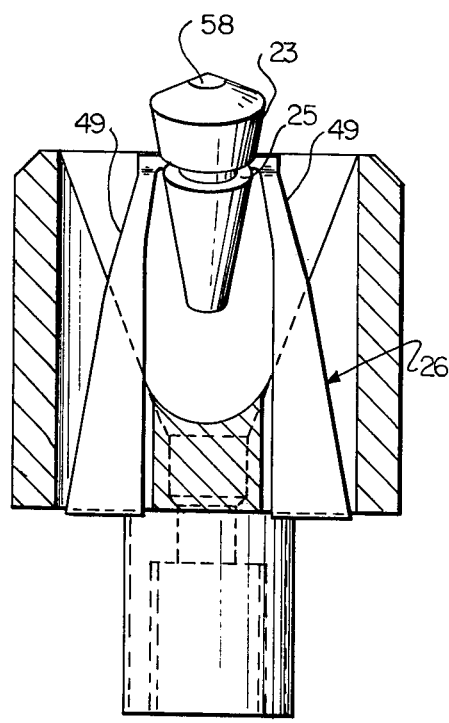
FIG. 6 is an enlarged sectional view taken generally along the line VI—VI in FIG. 5.

FIGS. 3 and 4 are views similar to FIGS. 5 and 6 but illustrate the relative positioning of the tapered rollers 23 within the tapered bore 9 when gripping a small diameter tool.

In operation, the control sleeve 14 is rotated relative to the dirt shield 53 and the cylindrical body 8 in a direction such that the control sleeve moves axially out from the cylindrical body 8. This outward axial movement permits the tapered rollers 23, under the influence of the spring 26, to move axially outward in the same proportion as the control sleeve 14 is moved outward and also radially outward along the increasing diameter tapered bore 11 of the cylindrical body 8. That is, the spring 26, which has connecting portions 51 abutting the inner edge 52 of the annular inwardly extending flange 16, is forced to move axially in direct response to the movement of the control sleeve 14. Since the arcuate joining portions 48 of spring 26 are engaged in the annular recesses 25 formed in the tapered rollers 23, the tapered rollers are forced to also move axially in relation to the movement of the control sleeve 14. Further, since as described above, the bifurcated arms 49 of spring 26 are bowed outwardly, the tapered rollers 23 follow the contour of the first cam means 57 positioned in the tapered bore 9 as they move axially outward. The result is that there is a sure, positive and continual opening of the gap formed between the tapered rollers 23 as the control sleeve 14 is rotated so as to assume an axially extending position, thereby permitting the entry of relatively larger diameter tools 24 within the gap. The smooth continual response of the tapered rollers 23 is further enhanced and assured as a result of the relatively long length of the spring arms 49, which permit an adequate beam deflection without distortion or metal fatigue.

When the gap between the tapered rollers 23 is sufficiently large to permit the insertion, a selected bit 24 is then inserted in the gap formed between the tapered rollers 23 and the relative rotation between the control sleeve 14 and the cylindrical body 8 is reversed such that the control sleeve 14 begins to axially retract or move towards the cylindrical body 8. As the control sleeve 14 retracts axially, the retaining cap 29, along with the anti-friction ball bearings 37 and the thrust washer 39, press against the ends 58 of the respective tapered rollers 23, thereby forcing the tapered rollers to move axially inwardly in relation to movement of the control sleeve 14, as well as radially inwardly as they follow the surface of the tapered bore 11. This axial and radial movement causes a reduction in the gap formed between the tapered rollers 23 and thereby provides a gripping force on the centrally positioned bit 24.

It will be noted that since all of the rollers 23 under the action of spring 26 are pressed against the tapered bore 11, the bit 24 will automatically be held in a centrally located position. While the tapered bore 11 includes a plurality of varying radius cam surfaces 56, the tapered rollers 23 will each seek the deepest portion of the respective varying radius cam surface, that is, the centrally positioned first cam means 57, during this hand tightening operation and thus assure the central positioning of the bit 24. After a moderate resistance to further rotation of the control sleeve 14 is encountered, the bit 24 is now sufficiently tightly gripped by the tapered rollers 23 to permit drilling or some other operation to commence.

The electric drill is then activated and the rotating bit 24 is presented to a work piece (not shown). The work piece will present a resistance to the tool 24 thereby, in effect, tending to produce relative counter rotation between the bit 24 and the cylindrical body 8. This effective relative rotation of the bit 24 to the body 8 tends to be passed through the tapered rollers 23, thereby causing the tapered rollers to rotate and translate out from the central recess of the first cam means 57 and along the varying radius cam surfaces 56, or second cam means, formed within the tapered bore 11. This action is assisted by the ball bearings 37 and thrust washer 39 which permit a planetary action of the tapered rollers 23. This shifting of the tapered rollers 23 along the varying radius cam surfaces 56 results in a self-tightening action being effected under torque load, in addition to the initial gripping force effected during the hand-tightening operation. That is, as the tapered rollers 23 rotate and translate along the varying radius cam surfaces 56, they move further radially inwardly, thereby effecting an increased gripping force upon the bit 24. This additional tightening force is a function of the resistance which the bit 24 encounters in performing a drilling operation upon the work piece and, therefore, the gripping force of the tapered rollers 23 upon the tool is varied in accordance with the requirements of the specific work operation being performed.

Upon completion of a specific work operation, the drill is deactivated and the keyless chuck 1 and tool 24 come to rest. When it is desired to remove the tool, the control sleeve 14 is rotated relative to the cylindrical body 8 in a direction opposite to the direction for effecting tightening. The combined action of the annular inwardly extending flange surface 52 against the spring connection portion 51 and the outwardly curved arms 49 tends to force the tapered rollers 23 in an axially and radially outwardly extending position, which results in a relaxing or releasing force tending to ease the grip of the tapered rollers 23 upon the bit 24, thereby assisting in the release of the tool 24 from the chuck 1. This relaxing action is assisted by the ball bearings 37 and thrust washer 39.

Figure 9:
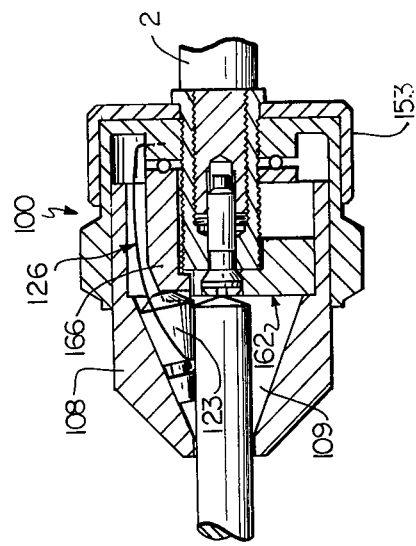
FIG. 9 is a side elevation, in section, of the keyless chuck illustrated in FIG. 8 gripping a large diameter bit.
Figure 8:
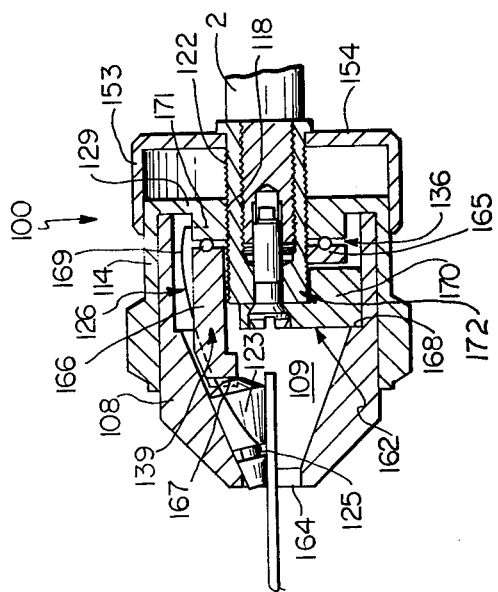
FIG. 8 is a side elevation, in section, of a second embodiment of the invention gripping a small diameter bit.

FIGS. 8 and 9 illustrate a second embodiment of the keyless chuck, generally designated by the reference character 100, of the present invention. In the embodiment, the reduced diameter end portions of the tapered rollers 123 extend towards the open, bit-insertion-end 164 of the chuck 100. The construction and operation of the chuck 100 is similar to that of previously described chuck 1 and, therefore, the construction and operation will be only briefly discussed. The keyless chuck 100 includes a cylindrical, longitudinally extending body 108 having an axially extending tapered bore 109. A cylindrical control sleeve 114 is provided partially surrounding the cylindrical body 108. An inwardly extending flange 129, formed at one end of the control sleeve 114 and partially enclosing one end of the cylindrical body 108 serves as a retaining means for an anti-friction thrust bearing 136 positioned within the bore of the cylindrical housing 108.

The anti-friction bearing assembly 136 includes a thrust element or washer 139 comprised of an annular ring portion 165 and a plurality of axially extending elongate fingers 166. The distal ends of each finger 166 includes a shallow trough portion 167 which receives the large end of a respective tapered roller 123.

A spacing collar 162 is also provided within the bore of the cylindrical housing 108. The spacing collar 162 is pressed into position seated against a shoulder 168 formed in the bore 109 of the cylindrical housing 108. The spacing collar 162 cannot move relative to either the cylindrical housing 108 or the control sleeve 114. The spacing collar 162 includes a plurality of radially extending arms 170, with one arm 170 being positioned between each of the axially extending elongate fingers 166. The arms 170 are so dimensioned that they permit the thrust washer 139 to rotate through approximately 15° before the axial fingers 166 abut against the radial arms 170.

A spring 126 includes a plurality of elongate arm members 169 engaged at one end in annular recesses 125 and at their other end in radial recesses 171 in the flange 129. Thus, the spring arms 169 positively control the axial positioning of the tapered rollers 123 relative to the tapered bore 109 in direct response to axial movement of the control sleeve 114, cylindrical housing 108 and anti-friction bearing assembly 136. The spring arms 169 also urge or press the tapered rollers 123 into contact with the wall surface of the tapered bore 109, thereby assuring that the tapered rollers 123 will always be in contact with the wall surfaces. The length of the spring arms 169 are so dimensioned that the large ends of tapered rollers 123 are maintained in contact with the trough portions 167 of the thrust washer 139.

A centrally positioned axially extending barrel sleeve 172 is provided; the barrel sleeve is mounted at one end to the spacing collar 162, and at its other end receives a drive spindle 2 of an electric drill in the same manner as described with regard to the first embodiment.

A dirt shield 153 is provided for preventing the entry of foreign particles into the areas of the cooperating threads 118 and 122 of the flange 129 and the barrel sleeve 172, respectively. The dirt shield 153 is non-rotatably attached with respect to the barrel sleeve 172 and the drive spindle 2 and, therefore, provides a means for preventing rotation of the drive spindle 2 during relative movement of the control sleeve 114 when either mounting or removing a bit 24. To assist in performing this function, the dirt shield 153 is provided with a knurled peripheral surface 154.

The operation of the embodiment shown in FIGS. 8 and 9 will be apparent from the above description and the discusion of the operation of the first embodiment, since this embodiment operates in a manner similar to the first embodiment, except for differences resulting from the modified construction.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description; and all changes which come within the meaning and range of equivalency of the claims are, therefore, to be embraced therein.

What is claimed is:

1. A self-tightening chuck for receiving a tool bit or the like, comprising:
 a chuck body having an internally tapered opening formed therein about a chuck axis and defined by a plurality of cam surface means;
 a hollow control sleeve mounted on said chuck body and in threaded engagement therewith for relative axial adjustment therebetween throughout a range of adjustment;
 a plurality of gripping rollers for gripping a tool bit located in said tapered opening, each gripping roller formed as a body of revolution about a respective gripping roller axis and having an annular groove formed therein; and
 a spring retainer for resiliently urging respective ones of said gripping rollers against respective ones of said cam surface means, said spring retainer including an elongated spring-arm pair for each of said gripping rollers, said spring-arm pairs extending in the direction of the chuck axis from a rearward end to a forward end, the arms of each spring-arm pair joined at said forward end by a spanning member that is received within the annular groove of its respective gripping roller and each arm of a spring-arm pair connected at the rearward end thereof to an adjacent arm of the next adjacent spring-arm pair to define said spring retainer, said spring retainer resiliently biasing one end of each gripping roller against a thrust receiving surface of said control sleeve, said gripping rollers movable relative to their respective cam surface means throughout said range of adjustment to vary the size of the tool receiving gap defined therebetween and to forcibly grip a tool bit therebetween in response to adjustment to said control sleeve relative to said chuck body, said gripping rollers movable relative to their respective cam surface means in response to a torque transmitted through a tool bit to increase the gripping force applied to the tool bit by said gripping rollers.

2. A self-tightening chuck for receiving a tool bit or the like, comprising:
 a chuck body having an internally tapered opening formed therein about a chuck axis and defined by a plurality of cam surface means;
 a hollow control sleeve mounted on said chuck body and in threaded engagement therewith for relative axial adjustment therebetween throughout a range of adjustment;
 a plurality of gripping rollers for gripping a tool bit located in said tapered opening, each gripping roller formed as a body of revolution about a respective gripping roller axis and having an annular groove formed therein; and
 a spring retainer for resiliently urging respective ones of said gripping rollers against respective ones of said cam surface means, said spring retainer including an elongated spring-arm pair for each of said gripping rollers, said spring-arm pairs extending in the direction of the chuck axis from a rearward end to a forward end, the arms of each spring-arm pair joined at said forward end by a spanning member that is received within the annular groove of its respective gripping roller and each arm of a spring-arm pair connected at the rearward end thereof to an adjacent arm of the next adjacent spring-arm pair to define said spring retainer, said spring retainer resiliently biasing one end of each gripping roller against an anti-friction thrust receiving bearing retained in said control sleeve, said gripping rollers movable relative to their respective cam surface means throughout said range of adjustment to vary the size of the tool receiving gap defined therebetween and to forcibly grip a tool bit therebetween in response to adjustment of said control sleeve relative to said chuck body, said gripping rollers movable relative to their respective cam surface means in response to a torque transmitted through a tool bit to increase the gripping force applied to the tool bit by said gripping rollers.

3. A self-tightening chuck for receiving a tool bit or the like, comprising:
a cylindrically formed chuck body having an internally tapered opening formed therein about a chuck axis and defined by a plurality of cam surface means;
a hollow, cylindrical control sleeve mounted on said chuck body and in threaded engagement therewith for relative axial adjustment therebetween throughout a range of adjustment;
a hollow, cylindrically formed dust shield secured to said chuck body and defining an annular space therebetween for telescopingly receiving said control sleeve during adjustment thereof;
a plurality of gripping rollers for gripping a tool bit located in said tapered opening, each gripping roller formed as a body of revolution about a respective gripping roller axis and having an annular groove formed therein; and
a spring retainer for resiliently urging respective ones of said gripping rollers against respective ones of said cam surface means, said spring retainer including an elongated spring-arm pair for each of said gripping rollers, said spring-arm pairs extending in the direction of the chuck axis from a forward end to a rearward end, the arms of each spring-arm pair joined at said forward end by a spanning member that is received within the annular groove of its respective gripping roller and each arm of a spring-arm pair connected at the rearward end thereof to an adjacent arm of the next adjacent spring-arm pair to define said spring retainer, said spring retainer resiliently biasing one end of each gripping roller against a thrust receiving surface of an anti-friction bearing retained in said control sleeve, said gripping rollers movable relative to their respective cam surface means throughout said range of adjustment to vary the size of the tool receiving gap defined therebetween and to forcibly grip a tool bit therebetween in response to adjustment of said control sleeve relative to said chuck body, said gripping rollers movable relative to their respective cam surface means in response to a torque transmitted through a tool bit to increase the gripping force applied to the tool bit by said gripping rollers.

4. The self-tightening chuck claimed in claims 1, 2, 3 wherein:
said spring retainer is formed as a unitary structure.

5. The self-tightening chuck claimed in claims 1, 2, or 3 wherein:
said spring arms curve in a radially outward direction as they extend from the rearward to the forward end.

6. The self-tightening chuck claimed in claims 1, 2, or 3 wherein:
the arms of each of said spring-arm pairs are formed as leaf-spring members.

7. The self-tightening chuck claimed in claims 1, 2, or 3 wherein:
said annular groove is formed intermediate the ends of the respective gripping roller.

8. The self-tightening chuck claimed in claims 1, 2, or 3 wherein:
said spanning member of each spring-arm pair engages its respective gripping roller on an inner side thereof to bias said gripping roller against its respective cam surface means.

9. The self-tightening chuck claimed in claims 1, 2 or 3 wherein:
said chuck body includes a plurality of axially extending bores therein and into which the rearward ends of said joined spring-arms extend during adjustment of said control sleeve relative to said chuck body.

10. The self-tightening chuck claimed in claims 1, 2, or 3 wherein:
said cam surface means is bidirectionally operative to cause said gripping rollers to increase the gripping force applied to a tool bit retained therebetween in response to torque transmitted through the tool bit in either a first or second direction.

11. The self-tightening chuck claimed in claims 2 or 3 wherein:
said thrust receiving bearing includes an annular thrust receiving washer against which the forward ends of said gripping rollers are resiliently biased by said spring retainer.

12. The self-tightening chuck claimed in claims 2 or 2 wherein:
said annular thrust receiving washer includes an annular raceway formed therein opposite an annular raceway formed in said control sleeve, and a plurality of rolling elements in said raceways to permit relative rotation therebetween.

13. The self-tightening chuck claimed in claim 3 wherein:
said chuck body includes a rearwardly extending threaded extension in threaded engagement with said control sleeve to permit relative adjustment therebetween, said dust shield secured to the rearward end of said extension.

* * * * *